United States Patent [19]

McMahan

[11] Patent Number: 4,842,252

[45] Date of Patent: Jun. 27, 1989

[54] RAPIDLY EXTENDABLE JACK

[76] Inventor: Dale A. McMahan, 1316 Lemon, Sulphur Springs, Tex. 75482

[21] Appl. No.: 157,797

[22] Filed: Feb. 19, 1988

[51] Int. Cl.⁴ ............................................. B01J 37/00
[52] U.S. Cl. .................................... 254/420; 254/424
[58] Field of Search ............................. 254/420, 424; 248/354.6, 407, 408

[56] References Cited

U.S. PATENT DOCUMENTS

| | | |
|---|---|---|
| 2,529,292 | 11/1950 | Greenfield . |
| 3,595,527 | 7/1971 | Douglass . |
| 3,709,467 | 1/1973 | Mann . |
| 3,957,249 | 5/1976 | Williams . |
| 4,078,774 | 3/1978 | Williams . |
| 4,221,362 | 9/1980 | Van Santen . |

Primary Examiner—James G. Smith
Assistant Examiner—David Holmes
Attorney, Agent, or Firm—Richards, Harris, Medlock & Andrews

[57] ABSTRACT

The present invention provides a three-piece telescoping jack that is capable of rapid coarse adjustments in height. The invention comprises first, second and third elongated tubular members that are somewhat nested in a telescoping relationship. The invention further comprises fine adjustment means for holding and adjusting the position of the second member in relation to the first and coarse adjustment means for holding and adjusting the position of the third member in relation to the second. The coarse adjustment means further allow the position of the third member to be rapidly adjusted, either retracted or extended, in relation to the second member. In a preferred embodiment, the fine adjustment means are a threaded nut and bolt. Also in a preferred embodiment, the coarse adjustment means are a pin and a series of holes in the second and third members.

15 Claims, 1 Drawing Sheet

RAPIDLY EXTENDABLE JACK

TECHNICAL FIELD

The present invention relates to an improved jack assembly that provides for rapid advance and retraction of an extendable leg and also provides additional height capacity for the jack. The invention comprises the addition of a third extendable leg to a typical two-piece jack construction. The third leg is attached to the jack through use of a coarse adjustment mechanism. such as a spring-loaded pin inserted through holes in the third leg, which secures the leg in relation to the jack and allows rapid advance of the third leg.

BACKGROUND OF THE INVENTION

The invention relates to a rapidly extendable jack intended for use with boat trailers, camping trailers, farm equipment and the like. The jack can be rapidly advanced or retracted to a desired height and also possesses additional height capacity over ordinary jacks.

Various types of jacks are known and used throughout the country. A common example is a car jack which consists of a lift device connected to a height adjustment mechanism that is mounted on a standard, and the mechanism allows continuous cranking of the lift device up the standard. Another example is a trailer jack which typically consists of two telescoping pieces with a height adjustment means that extends or retracts one piece in relation to the second. Usually, this height adjustment means is a threaded bolt and nut. The nut is placed in the top end of the inner telescoping piece and the bolt is threadably engaged through the nut and extends inside the telescoping piece. The bolt also extends through the end of the outer piece where it is connected to a handle used to crank the jack. In use, the handle is extended from or retracted into the outer piece. A jack of this type is disclosed in U.S. Pat. No. 3,595,527.

The problem with this type of standard two-piece telescoping jack is that the jack must be cranked continuously from the fully retracted position to the desired extended position, i.e., the nut must be turned down the bolt. In use, the jack typically is extended 12 inches or more requiring 100 to 125 complete turns on the handle for the jack to be the desired height to contact the ground from the tongue of a trailer. Then an additional 20-25 cranks are necessary to further raise the trailer. This cranking must be repeated to retract the jack. This excessive cranking can cause wear and tear on the jack and on the person doing the cranking. Therefore, it would be very desirable to have a jack capable of rapid advance and retraction.

U.S. Pat. No. 3,595,527 discloses a jack assembly somewhat capable of rapid retraction and extension. It discloses the use of a standard two-piece telescoping jack that is inserted through a tubular support. The outer piece of the jack has radial projections along its side that engage within an L-shaped slot in the tubular support. The jack is simply adjusted in relation to the support. Other types of jacks somewhat capable of rapid advance are disclosed in U.S. Pat. Nos. 4,078,774; 4,221,362; 3,957,249; 3,709,467; and 2,529,292. The present invention, however, provides a jack capable of rapid height adjustment that differs from those jacks disclosed in the above-cited patents.

Another problem with the standard two-piece trailer jacks currently in use is the lack of sufficient jack capacity to raise the tongue of the trailer high enough off the ground to clear the knob on the hitch of a truck or other vehicle. For one reason or another, most of the jacks in use require 3–4 inches of blocks under the foot of the jack to provide enough height capacity to raise the trailer tongue to a height sufficient to attach the trailer to a truck. It would be desirable to have a jack with additional capacity to alleviate the need for using blocks.

The present invention provides an extendable jack with rapid advance and retraction that alleviates excessive cranking in the use of the jack. In addition, the present invention provides additional jack capacity of up to 20 inches or more over the standard trailer jack.

SUMMARY OF THE INVENTION

The present invention provides an improved extendable jack capable of rapid extension and retraction and comprising a first elongated tubular member, a second elongated tubular member, a third elongated tubular member, fine adjustment means, and coarse adjustment means. The second tubular member is slidable within the first and its upper end is within the first and its lower end extends beyond the first member. Likewise, the third tubular member is slidable within the second with its upper end within the second and its lower end extending beyond the second member. The fine adjustment means secure the second member in relation to the first and allows fine positioning in extending or retracting the second member in relation to the first. The coarse adjustment means secures the third tubular member in relation to the second and allows rapid extension and retraction of the third member in relation to the second.

In one embodiment of the invention, the fine adjustment means includes a threaded bolt and nut. The nut is attached to the second tubular member, and the bolt is threadably engaged with the nut. The bolt is engaged with the first tubular member and extends beyond it to allow attachment of a handle.

In a preferred embodiment of the invention, the coarse adjustment means include a pin, a hole near the lower end of the second tubular member and a series of holes along the side of the third tubular member. With the pin removed, the third member is adjusted to substantially the desired extension from the second member, and the pin is inserted through the hold in the second member and the closest corresponding hole in the third member. The pin may be spring-loaded to aid in keeping the pin in place. Other similar devices may also be used for the coarse adjustment means.

The jack of the present invention may further comprise a foot mounted on the lower end of the third tubular member. It may also comprise a mounting plate attached to the first tubular member for mounting the jack to the tongue of a trailer.

The invention further provides a jack extension device for extending the height capacity of a telescoping two-piece jack and providing rapid extension and retraction of the jack. The device includes an elongated tubular member and coarse adjustment means for securing the member in a desired position in relation to the jack and allowing rapid extension and retraction of the member in relation to the jack.

BRIEF DESCRIPTION OF THE DRAWINGS

The foregoing and additional objects and advantages of the invention will be more apparent when the following detailed description is read in conjunction with the accompanying drawings, wherein like reference characters denote like parts in all views and wherein.

DETAILED DESCRIPTION

Figures 1, 2:
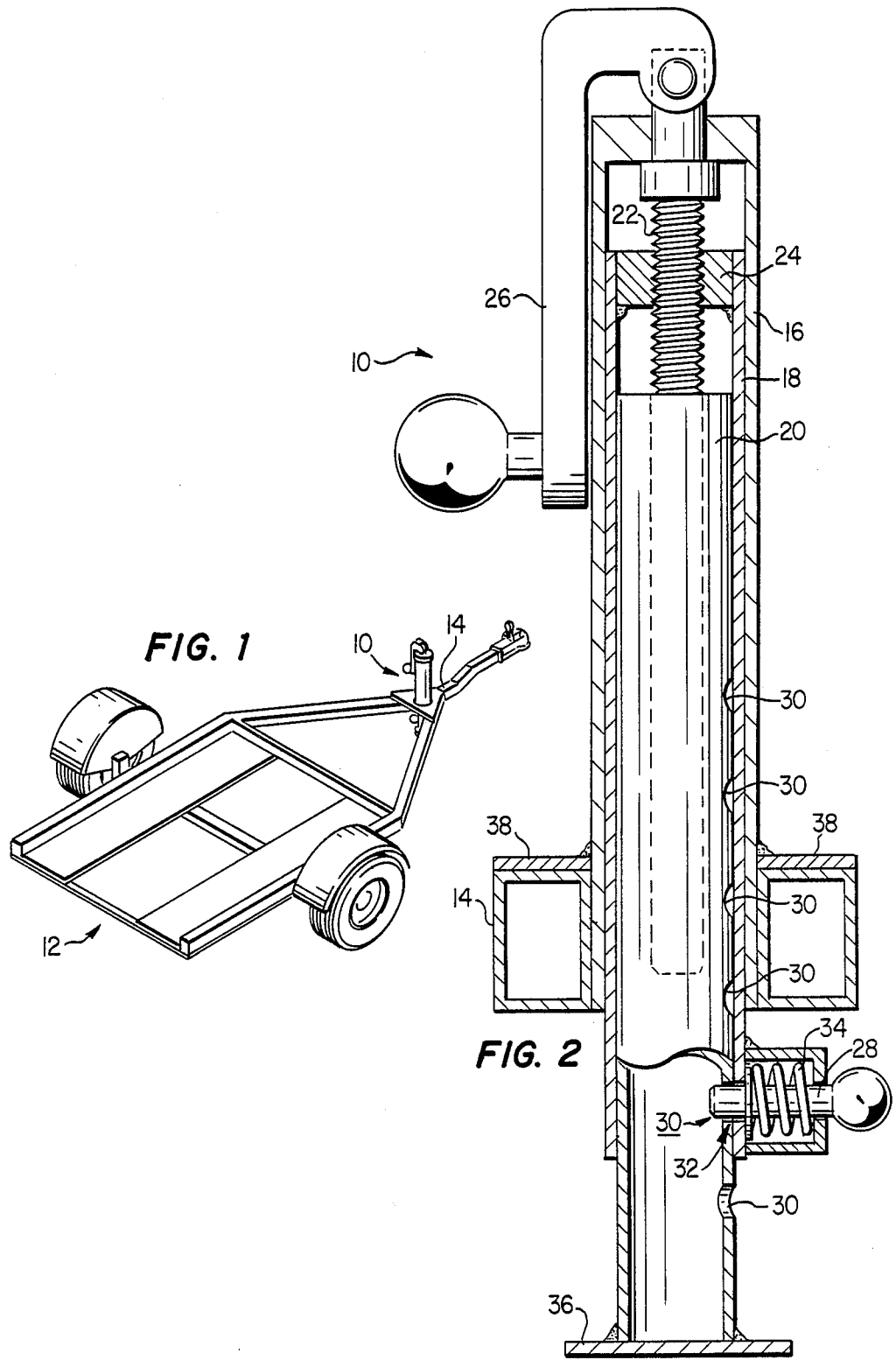
FIG. 1 is a perspective view of a trailer with a jack as described by the present invention mounted on the tongue of the trailer.
FIG. 2 is a partial cross-sectional side view of one embodiment of a jack of the present invention.

The present invention provides a readily extendable and retractable jack for use with boat trailers, camping trailers, farm equipment and many other uses requiring an extendable jack. The invention includes the addition of a third extendable leg to a typical two-piece telescoping jack and the addition of a coarse adjustment means for securing the third leg and allowing it to be easily extended or retracted.

Referring to the drawings, FIG. 1 shows a jack 10 as described by the present invention used with a typical flat bed trailer 12. The jack 10 is mounted in the tongue 14 of the trailer 12. FIG. 2 shows a partial cross-sectional and cut away view of one embodiment of the present invention. Jack 10 includes a first elongated tubular member 16, a second elongated tubular member 18, and a third elongated tubular member 20. Thus, the present invention includes an additional extendable member over the typical two-piece jack assembly known previously in the art.

It should be noted, that tubular, as used herein, is not limited to a cylindrical tube configuration, but rather, it includes practically any geometrically-shaped tubing that may be used to construct a jack. Examples of various shaped tubular members include square tubing, triangular-shaped tubing, hexagonal tubing, etc. As known in the art, the tubular members must be sturdy so as to withstand the forces of raising a heavy load.

The three tubular members 16, 18 and 20 are arranged in telescoping fashion such that the second member 18 is slidable within the first member 16, and the third member 20 is slidable within the second member 18. Tubular member 18 is positioned such that its upper end is within tubular member 16 and its lower end extends beyond tubular member 16. Likewise, tubular member 20 has its upper end positioned within tubular member 18 and its lower end extends beyond member 18. Even when the jack 10 is extended, the tubular members 18 and 20 remain at least partially nested within members 16 and 18, respectively.

Tubular members 18 and 20 are extendable in relation to members 16 and 18. The relative positioning of members 18 and 20, and thus the height of the jack 10, is controlled by the use of two adjustment mechanisms: a fine adjustment mechanism and a coarse adjustment mechanism. In jack 10, the fine adjustment mechanism consists of a threaded bolt 22 and a nut 24 with associated threads. Nut 24 is positioned in the upper end of member 18 and receives bolt 22. Bolt 22 lies substantially within tubular members 16, 18, and 20, and it extends substantially the length of member 16. It should be noted that tubular member 20 has and open upper end allowing bolt 22 to pass inside member 20 without any interconnection. The non-threaded upper end of bolt 22 is mounted in the upper end of tubular member 16 such that it may rotate freely in relation to member 16, and bolt 22 extends external to member 16 to facilitate the attachment of handle 26 to bolt 22. In FIGS. 1 and 2, handle 26 is shown in the down or stored position. When handle 26 is raised to a horizontal position, it may be rotated in a horizontal circular rotation in either a clockwise or counterclockwise direction. Rotating handle 26 causes bolt 22 to turn within nut 24 causing tubular member 18 to move longitudinally within member 16 either extending or retracting in relation to member 16 depending on which way the handle is turned.

As mentioned, the problem with two-piece known jacks that use a similar nut and bolt assembly to that just described is that the jack must be cranked numerous times to achieve any substantial extension or retraction of the jack. Indeed, most two-piece jacks require over 100 cranks to fully extend or retract the jack. The present invention greatly reduces the need for cranking by providing a third piece, tubular member 20, that may be rapidly advanced or retracted using a coarse adjustment means.

In the embodiment of the invention shown in FIGURE 2, the coarse adjustment means include a spring-loaded pin 28 mounted near the lower end of tubular member 18 and a series of holes 30 along the length of tubular member 20. Pin 28 is inserted through a hole 32 in tubular member 18 and through one of the holes 30 in member 20. The loading provided by spring 34 retains pin 28 in position. Thus, tubular member 20 is held in position or secured in relation to member 18 by pin 28. Member 20 may be readily extended or retracted in relation to member 18 by removing the pin 28, adjusting the position of member 20 to the new desired position while matching up hole 32 with one of the holes 30, and reinserting the pin 28 through the associated holes. In this manner, jack 10 may be readily extended or retracted without requiring any cranking of handle 26.

Of course, the coarse adjustment using pin 28 may not be performed with any load on the jack, but rather, the jack 10 is adjusted to approximately the required height using the coarse adjustment means prior to any load being placed on the jack. After a load is placed on the jack, any further adjustments may be made using the fine adjustment means.

It is important that the pin 28 be constructed of high tensile strength materials so as to be capable of withstanding the shear forces imparted by the jack and any load placed on the jack. Also, the arrangement and structure of pin 28 may be varied from that shown in FIG. 2. For example, pin 28 may be extended through both sides of tubular members 18 and 20. Pin 28 may also be replaced by any other mechanism that would hold tubular member 20 in position under load and allow coarse adjustment of member 20 under no load. Examples of such mechanisms might include the combinations of notches and collars, radial projections and slots, slots and plates, etc.

Jack 10. as shown in FIG. 2, has a foot 36 mounted on the lower end of tubular member 20 adapted for contacting the ground and providing a stable base for the jack. Jack 10 may also include a mounting plate 38 welded to tubular member 16 allowing jack 10 to be mounted onto the tongue 14 of a trailer using bolts or other attachment means.

The present invention provides a jack that has additional height capacity of up to 20 inches or more over ordinary two-piece jacks. This is important because it avoids the need to use blocks in jacking up a trailer or other device. It also allows the jack to be mounted on the tongue of a trailer higher above the ground thereby lessening the chance that the jack might hit an obstruction on the ground and break off.

From the foregoing detailed description, it is apparent that the invention describes an improved jack that is rapidly extendable and retractable. Having described only a preferred embodiment, it will be apparent to those skilled in the art that various modifications may be made without departing from the scope of the invention.

I claim:

1. A jack comprising:
   a first elongated tubular member capable of rigid attachment to the tongue of a trailer;
   a second elongated tubular member slidable within the first member and having an upper end positioned within the first member and a lower end extending beyond the first member;
   fine adjustment means for securing the second member in a desired position in relation to the first member and allowing fine adjustment of the position of the second member in relation to the first member;
   a third elongated tubular member slidable within the second member and having an upper end positioned within the second member and a lower end extending beyond the second member; and
   coarse adjustment means for securing the third member in a desired position in relation to the second member and allowing rapid extension or retraction of the third member in relation to the second member.

2. The jack of claim 1 wherein the fine adjustment means include a threaded bolt and nut with the nut being attached to the second member and the bolt rotatably engaged with the first member and the bolt being threadably engaged with the nut.

3. The jack of claim 1 wherein the coarse adjustment means include a pin, the second member having a hole for the insertion of the pin near its lower end, and the third member having a series of holes substantially along its length of the insertion of the pin.

4. The jack of claim 3 wherein the pin is springloaded.

5. The jack of claim 1 further comprising a foot mounted on the lower end of the third member and being adapted to provide a stable base when contacting the ground.

6. The jack of claim 1 further comprising a mounting plate attached to the first member for mounting the jack to the tongue of a trailer.

7. A jack comprising:
   a first elongated tubular member capable of rigid attachment to the tongue of a trailer;
   a second elongated tubular member slidable within the first member and having an upper end positioned within the first member and a lower end extending beyond the first member;
   a threaded nut mounted radially within the upper end of the second member;
   a threaded bolt held longitudinally within the first member and rotatably engaged with the first member such that the bolt may rotate within the first member, and a portion of the bolt extending beyond the first member, and the bolt being threadably engaged with the nut such that when the bolt is rotated it causes the second member to extend or retract in relation to the first member;
   a third elongated tubular member slidable within the second member and having an upper end positioned within the second member and a lower end extending beyond the second member; and
   coarse adjustment means for holding the third member in a desired position in relation to the second member and allowing rapid extension or retraction of the third member in relation to the second member.

8. The jack of claim 7 wherein the coarse adjustment means comprise a pin, the second member having a hole for the insertion of the pin near its lower end, and the third member having a series of holes substantially along its length for the insertion of the pin.

9. The jack of claim 8 wherein the pin is spring-loaded.

10. The jack of claim 7 further comprising a foot mounted on the lower end of the third member and adapted to provide a stable base when contacting the ground.

11. The jack of claim 7 further comprising a mounting plate attached to the first member for mounting the jack to the tongue of a trailer.

12. In a jack assembly comprising a first elongated tubular member capable of rigid attachment to the tongue of a trailer, a second elongated tubular member slidable within the first member, the second member having an upper end positioned within the first member and a lower end extending beyond the first member, and a threaded bolt and nut means for adjusting longitudinally the second member relative to the first, the improvement comprising a third elongated tubular member adapted to slide within the second tubular member and having an upper end positioned within the second member and a lower end extending beyond the second member, and a coarse adjustment means for securing the third member in a desired position in relation to the second member and for allowing rapid extension or retraction of the third member in relation to the second.

13. The jack of claim 12 wherein the coarse adjustment means comprise a pin, the second member having a hole for the insertion of the pin near its lower end, and the third member having a series of holes substantially along its length for the insertion of the pin.

14. The jack of claim 12 further comprising a foot mounted on the lower end of the third member and being adapted to provide a stable base when contacting the ground.

15. The jack of claim 12 further comprising a mounting plate attached to the first member for mounting the jack to the tongue of a trailer.

* * * * *